United States Patent
Bennis

(10) Patent No.: US 12,163,974 B2
(45) Date of Patent: Dec. 10, 2024

(54) MOTION DETECTOR WITH ACCELEROMETER AND FALSE TAMPERING DETECTION

(71) Applicant: Robert Bosch GmbH, Stuttgart (DE)

(72) Inventor: Othmane Bennis, Rochester, NY (US)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 17/585,367

(22) Filed: Jan. 26, 2022

(65) Prior Publication Data

US 2023/0236217 A1 Jul. 27, 2023

(51) Int. Cl.
| | |
|---|---|
| *G01P 13/00* | (2006.01) |
| *G01P 1/00* | (2006.01) |
| *G01P 15/00* | (2006.01) |
| *G08B 29/04* | (2006.01) |
| *G08B 29/24* | (2006.01) |

(52) U.S. Cl.
CPC ............... *G01P 13/00* (2013.01); *G01P 1/06* (2013.01); *G01P 15/00* (2013.01); *G08B 29/046* (2013.01); *G08B 29/24* (2013.01)

(58) Field of Classification Search
CPC .. G01P 13/00; G01P 1/06; G01P 15/00; G01P 13/02; G08B 29/046; G08B 29/24
USPC .......................................................... 73/488
See application file for complete search history.

(56) References Cited

U.S. PATENT DOCUMENTS

| | | | |
|---|---|---|---|
| 7,295,112 B2 | 11/2007 | Bowser et al. | |
| 10,062,249 B1 | 8/2018 | Modi et al. | |
| 10,403,103 B1 | 9/2019 | Kugler et al. | |
| 10,600,293 B2 | 3/2020 | McClintock | |
| 2009/0167538 A1* | 7/2009 | Merritt .................... | G08B 13/02 340/600 |
| 2010/0032332 A1 | 2/2010 | Davis et al. | |
| 2010/0283611 A1* | 11/2010 | Smith .................. | G08B 13/193 340/568.1 |
| 2011/0261195 A1 | 10/2011 | Martin et al. | |
| 2018/0135336 A1 | 5/2018 | Johnson et al. | |
| 2019/0206207 A1 | 7/2019 | Mysell | |
| 2020/0174552 A1* | 6/2020 | Stafford ............. | G01C 19/5783 |
| 2020/0372784 A1* | 11/2020 | Bertacchini .......... | G01S 13/886 |

FOREIGN PATENT DOCUMENTS

WO 2021021918 A1 2/2021

OTHER PUBLICATIONS

Extended European Search Report for Application No. 23152849.8 dated Jun. 21, 2023 (8 pages).

* cited by examiner

*Primary Examiner* — Lee E Rodak
*Assistant Examiner* — Byung Ro Lee
(74) *Attorney, Agent, or Firm* — Michael Best & Friedrich LLP

(57) ABSTRACT

A system for tamper detection of a motion detector. The system includes an electronic controller configured to receive orientation data from an accelerometer of the motion detector. The electronic controller is also configured to filter the orientation data of the accelerometer of the motion detector. The electronic controller is further configured to determine an orientation of the motion detector using the filtered orientation data. The electronic controller is also configured to identify a tamper condition of the motion detector based on the orientation of the motion detector. The electronic controller is further configured to activate an alarm device of the motion detector based on the tamper condition.

17 Claims, 4 Drawing Sheets

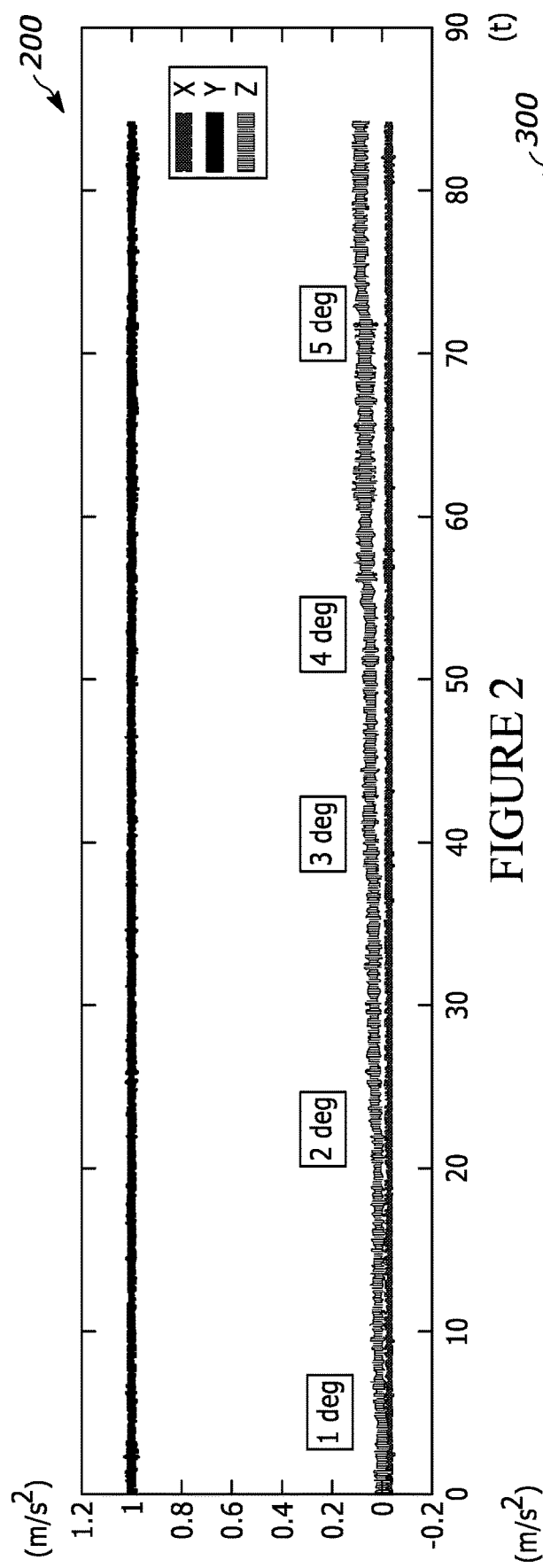
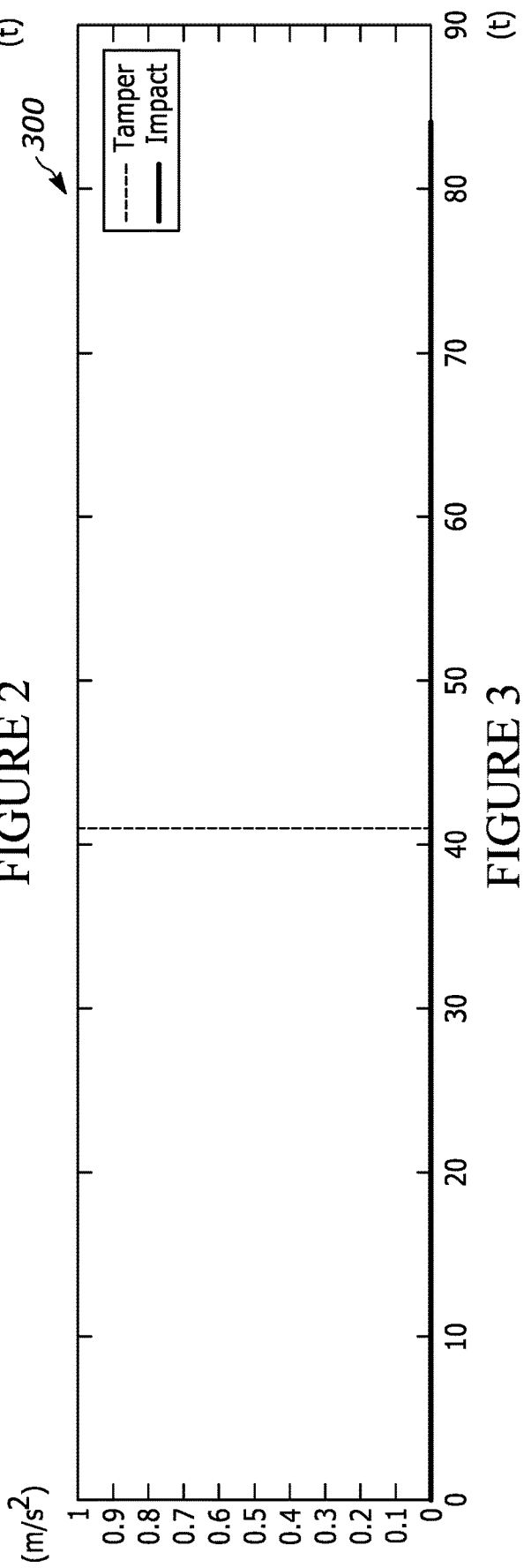
FIGURE 2
FIGURE 3

MOTION DETECTOR WITH ACCELEROMETER AND FALSE TAMPERING DETECTION

FIELD

Embodiments relate to motion detector tamper systems.

BACKGROUND

A motion detector or sensor is an electrical device (more specifically, an electronic device) that is designed to detect and measure motion. Motion detectors are often used in home and business security systems. Typically, a motion detector includes a sensor or sensing element, an embedded processor or computer, a housing, and a communication or similar interface to allow for interaction with other components or systems. Motion sensors can be used, for example, to activate floodlights, trigger audible alarms, activate switches, and alert police.

SUMMARY

As noted, motion detectors are often used in security systems. If a motion detector is damaged or purposely tampered with, the effectiveness of the security system in which the motion detector is used may be compromised. Embodiments described herein provide, among other things, a motion detector equipped with a tamper detection mechanism. The tamper detection mechanism is configured to detect physical force acting on the motion detector that may reduce the motion detector's ability to sense motion accurately. When certain physical force is detected by the tamper mechanism, a signal is generated to trigger an alarm of the motion detector. Embodiments described herein may include features to avoid triggering an alarm in circumstances where the sensed force is unlikely to adversely effect accurate sensing of motion.

One embodiment provides system for tamper detection of a motion detector. The system includes an electronic controller configured to receive orientation data from an accelerometer of the motion detector. The electronic controller is also configured to filter the orientation data of the accelerometer of the motion detector. The electronic controller is further configured to determine an orientation of the motion detector using the filtered orientation data. The electronic controller is also configured to identify a tamper condition of the motion detector based on the orientation of the motion detector. The electronic controller is further configured to activate an alarm device of the motion detector based on the tamper condition.

Another embodiment provides a method for tamper detection of a motion detector. The method includes receiving, via an electronic controller, orientation data from an accelerometer of the motion detector. The method also includes filtering, via the electronic controller, the orientation data of the accelerometer of the motion detector. The method further includes determining, via the electronic controller, an orientation of the motion detector using the filtered orientation data. The method also includes identifying, via the electronic controller, a tamper condition of the motion detector using the orientation of the motion detector. The method further includes activating, via the electronic controller, an alarm device of the motion detector based on the tamper condition.

Another embodiment provides a motion detector. The motion detector includes an alarm device, an electronic controller, at least one sensor, and an accelerometer. The at least one sensor provides an indication of motion to the electronic controller. The accelerometer provides orientation data of the motion detector to the electronic controller. The electronic controller is configured to filter orientation data of the accelerometer. The electronic controller is also configured to determine an orientation of the motion detector using the filtered orientation data. The electronic controller is further configured to identify a tamper condition of the motion detector based on the orientation of the motion detector. The electronic controller is also configured to activate an alarm device of the motion detector based on the tamper condition.

Other aspects of the invention will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

FIG. 2 depicts a graph of signal readings of the motion detector of FIG. 1, according to some embodiments.

FIG. 3 depicts a graph of signal readings of the motion detector of FIG. 1, according to some embodiments.

Figure 1:
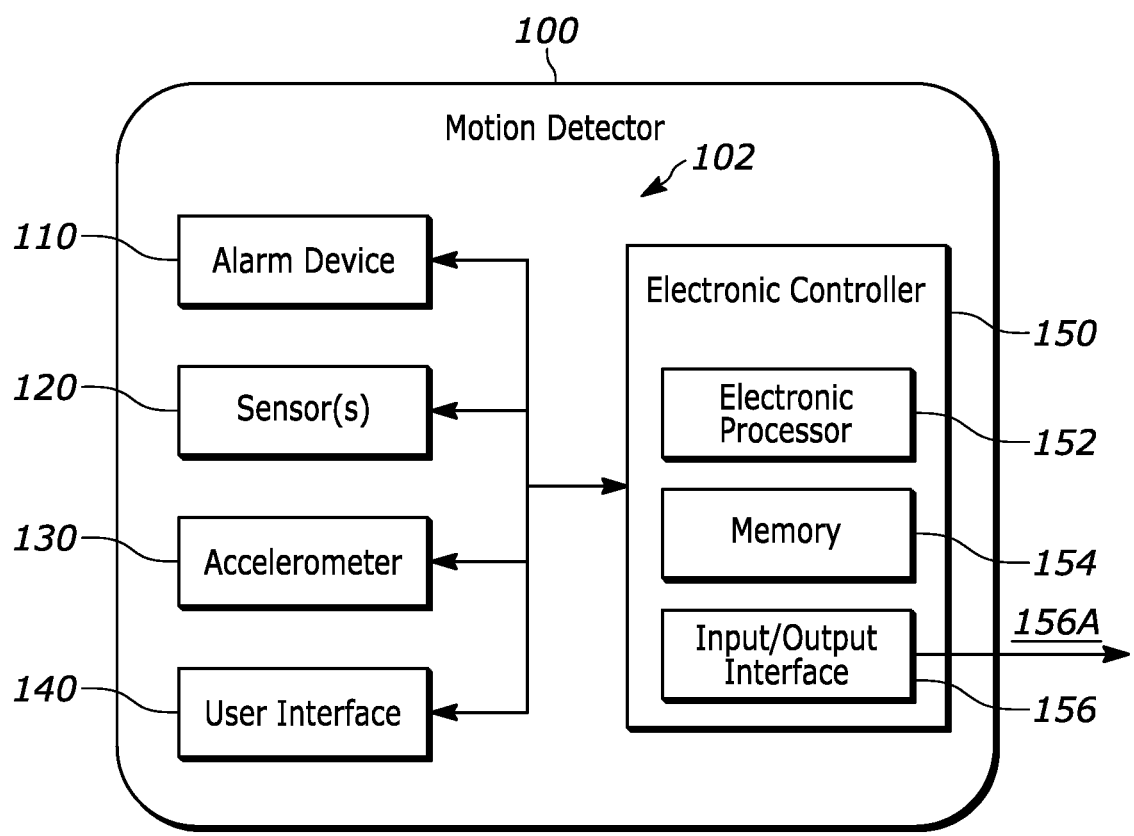
FIG. 1 is a block diagram of a motion detector, according to some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before any embodiments are explained in detail, it is to be understood that the examples presented herein are not limited in their application to the details of construction and the arrangement of components set forth in the following description or illustrated in the following drawings. Embodiments may be practiced or carried out in various ways.

It should also be noted that a plurality of hardware and software-based devices, as well as a plurality of different structural components may be used to implement the embodiments presented herein. In addition, it should be understood that embodiments may include hardware, software, and electronic components that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (for example, stored on non-transitory computer-readable medium) executable by one or more processors. As such, it should be noted that a plurality of hardware and software-based devices, as well as a plurality of different structural components may be utilized to implement the embodiments presented. For example, "control units" and "controllers" described in the specification can include one or more electronic processors, one or more memory modules including non-transitory computer-readable medium, one or more input/output interfaces, and various connections (for example, a system bus) connecting the components.

For ease of description, each of the example systems presented herein is illustrated with a single exemplar of each of its component parts. Some examples may not describe or illustrate all components of the systems. Other embodiments may include more or fewer of each of the illustrated components, may combine some components, or may include additional or alternative components.

FIG. 1 is a block diagram of one example of a motion detector 100 that includes a number of components that comprise a system 102 for tamper detection. The motion detector 100 illustrated in FIG. 1 is an electrical device that utilizes a sensor to detect motion. In some implementations, the system 102 is included in an electrical device with one or more sensors. For example, the system 102 may be implemented in a surveillance camera, an automated light, or other device.

In the example, illustrated in FIG. 1, the system 102 includes an alert output device or alarm device 110, sensor(s) 120, an accelerometer 130, a user interface 140, and an electronic controller 150. In some implementations, the system 102 includes fewer or additional components in configurations different from the one illustrated in FIG. 1. In some implementations, the various components of the system 102 are not contained within the motion detector 100. For example, the alarm device 110 can be remote to the system 102.

The alarm device 110 provides an alert of the motion detector 100 in response to certain conditions being determined, for example, by the electronic controller 150. The alarm device 110 may provide an alert using one or more alert components, such as visual and/or audio components in response to receiving a signal from the electronic controller 150. The alarm device 110 may receive data via one or more wired couplings (for example, wires, optical fiber, and the like), wirelessly, or a combination thereof. For example, the alarm device 110 receives signals wirelessly using, for example, Wi-Fi, Bluetooth, or other connections.

In the example illustrated, the sensor(s) 120 are part of the motion detector 100, but may also be connected to the motion detector via various wired or wireless connections. The sensor(s) 120 provide sensor readings or output signals to the electronic controller and are configured to detect, among other things, objects and motion of the objects within an operating environment of the motion detector 100. The sensor(s) 120 include, for example, infrared sensors, radar sensors, temperature sensors, etc. In some implementations, the sensor(s) 120 of the motion detector 100 detect objects accessing a defined area. For example, the sensor(s) 120 of the motion detector 100 are positioned near a structural access point (for example, a door or turnstile) to detect objects (for example, people) accessing the defined area via the structural access point. The operating environment or area surrounding the motion detector 100 that is monitored is defined, at least in part, by the performance capabilities of the sensor(s) 120. For example, an infrared sensor may have a field of view and sensitivity rating. An object outside the field of view or that generates heat below the sensitivity rating may not be detected. Radar and other sensors that may be used have similar (at least in concept) operating constraints that impact that operating environment or area that may be monitored.

The accelerometer 130 is connected to the electronic controller 150 and is configured to sense, for example, acceleration forces acting on the motion detector 100. For example, the accelerometer outputs a signal or signals that are indicative of one or more accelerations acting on the motion detector 100 to the electronic controller 150. The signals may be indicative of the orientation and coordinate acceleration of the motion detector 100. For example, the orientation and coordinate acceleration sensed by the accelerometer 130 may indicate that the motion detector 100 is moving. The accelerometer 130 may include, for example, single-axis or multi-axis accelerometers, which can detect both the magnitude and the direction of an acceleration or accelerations of the motion detector 100. In some implementations, the accelerometer 130 senses the affects of vibration and shock forces within an operating environment on the motion detector 100.

The user interface 140 may include, for example, one or more input mechanisms (for example, a touch screen, a keypad, buttons, and the like), one or more output mechanisms (for example, a display, a speaker, light emitting diode (LED), and others), or a combination thereof. In some implementations, the user interface 140 includes a touch-sensitive interface (for example, a touch-screen display) that displays visual output generated by software applications executed by the electronic processor 152. Visual output includes, for example, graphical indicators, lights, colors, text, images, graphical user interfaces (GUIs), combinations of the foregoing, and the like. The touch-sensitive interface also receives user input using detected physical contact (for example, detected capacitance or resistance). In some implementations, the user interface 140 is located remote from the motion detector 100.

The electronic controller 150 illustrated in FIG. 1 includes an electronic processor 152 (for example, one or more microprocessors, field-programmable gate array ("FPGA"), application-specific integrated circuits (ASICs), systems-on-a-chip (SoCs), or other electronic devices), a memory 154, and an input/output interface 156. The components included in the electronic controller 150 are connected to each other via one or more buses or other electrical connections (not shown). In some embodiments, the electronic controller 106 includes a plurality of electrical and electronic components that provide power, operational control, and protection to the components and modules within the electronic controller 106.

The memory 154 includes, for example, read only memory (ROM), random access memory (RAM), an electrically erasable programmable read-only memory (EEPROM), other non-transitory computer-readable media, or a combination thereof. As used in the present application, "non-transitory computer-readable media" comprises all computer-readable media but does not consist of a transitory, propagating signal. In some implementations, the memory 154 is included in the electronic processor 152. In some embodiments, the electronic processor 152 is configured to retrieve computer-readable instructions and data from the memory 154 and execute the computer-readable instructions to perform the functionality and methods described herein. The input/output interface 156 includes hardware and software components for transferring data of components located within the electronic controller 150 to components external to the electronic controller 150. The input/output interface 156 is configured to transmit and receive data via one or more wired connections (for example, cables, wires, optical fiber, and the like), wirelessly, or a combination thereof.

As noted above, the electronic controller 150 receives an output signal or signals from the accelerometer 130. In some implementations, the electronic controller 150 processes the output signals of the accelerometer 130 continuously. In other embodiments, the electronic controller 150 processes the signals of the accelerometer 130 periodically or processes the signals in response to a detected change in position of the accelerometer 130 or motion of the sensor(s) 120. In some implementations, the electronic controller 150 converts the output signal or signals of the accelerometer 130 to orientation data associated with the motion detector 100. In other embodiments, the electronic controller 150 stores the orientation data in the memory 154. The electronic processor 152 utilizes the orientation data of the accelerometer 130 to determine a reference position (e.g., a set of reference points) and a tilt angle value of the motion detector 100. The electronic controller 150 utilizes the input/output interface 156 to transmit an alert signal to the alarm device 110 to indicate a tamper condition of the motion detector 100 based on the reference position and the tilt angle. The electronic controller 150 also utilizes the input/output interface 156 to transmit an external alert signal 156A to components external to the motion detector 100, such as a security monitoring system, and the like.

FIG. 2 depicts an orientation graph 200 that illustrates how an impact affects the orientation of the motion detector 100. In this example embodiment, the graph 200 is a plot of the x, y, and z axis of the accelerometer 130 signal. The graph 200 is exemplary of a gradual change of a tilt angle of the z-axis of the motion detector 100 with respect to time (t) and force (g) (e.g., acceleration) due to an external impact to the motion detector 100 or to a surface supporting the motion detector 100. Some examples of the types of external impacts include vibration, shock, etc. due to impacts to the motion detector 100 or the surfaces the motion detector 100 may be placed on or affixed to. The graph 200 displays the deviation of the tilt angle of the z-axis of the motion detector 100 from an initial reference position (e.g., a set of reference points). Additionally, the graph 200 includes a calculation of the tilt angle of the motion detector 100 by the electronic controller 150 at various time intervals.

FIG. 3 depicts a tamper condition graph 300 that illustrates a tamper condition corresponding to the impact affecting the orientation of the motion detector 100 in FIG. 2. In this example embodiment, the graph 300 is a plot of the impact sensed by the accelerometer 130 and a tamper condition of the motion detector 100. The graph 300 shows the presence of an external impact on the motion detector 100 and identification of the tamper condition of the motion detector 100 with respect to time (t) and force (g) (e.g., acceleration) due to the external impact. For example, the electronic controller 150 sets a deviation threshold of approximately three (3) degrees and a temporal threshold (e.g., debounce time) of three hundred (300) milliseconds to identify a tamper condition of the motion detector 100. The electronic controller 150 determines that the tilt angle of the z-axis of the motion detector 100 exceeds the deviation threshold at t=41 seconds. The electronic controller 150 initiates a timer (not shown) associated with the temporal threshold (e.g., 300 milliseconds) and determines that the tilt angle of the z-axis of the motion detector 100 exceeds the deviation threshold after the temporal threshold has expired. In the example shown, the electronic controller 150 determines that a tamper condition of the motion detector 100 is occurring at approximately 41 seconds as depicted in the graph 300.

Figure 4:
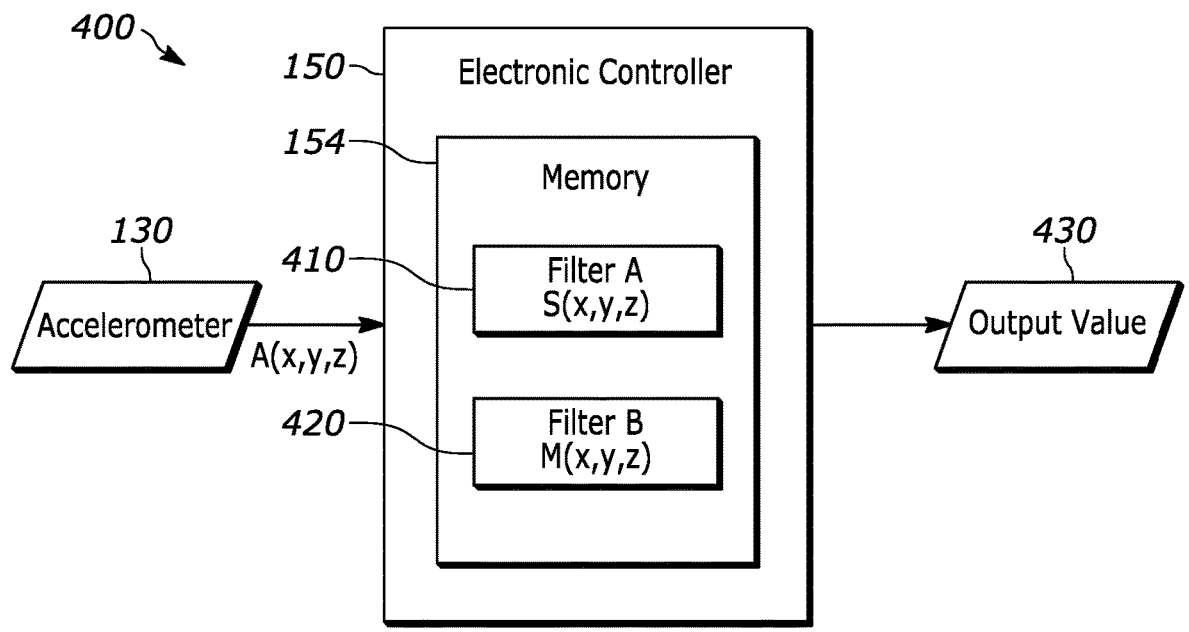
FIG. 4 is a block diagram of components of the motion detector of FIG. 1 processing signal readings, according to some embodiments.

FIG. 4 is a diagram of an orientation workflow 400 for processing orientation data of the accelerometer 130. As shown in FIG. 4, an output signal, such as A(x, y, z), of the accelerometer 130 is processed by the electronic controller 150 to determine a tilt angle value of the motion detector 100. In the example shown, the memory 154 includes a filter A 410, and a filter B 420. The electronic controller 150 generates an output value 430. The filter A 410 and the filter B 420 may be implemented as software, and in some implementations, the filter A 410 and the filter B 420 are rate limiting filters. The filter A 410 may include a time constant for sampling acceleration data form the accelerometer 130 that is larger than a time constant for the filter B 420. The electronic controller 150 processes the output signal of the accelerometer 130 using the filter A 410 to determine a reference position of the motion detector 100. The electronic controller 150 processes the output signal of the accelerometer 130 using the filter B 420 to determine the current position of the motion detector 100. In some implementations, the electronic controller 150 utilizes the current position of the filter B 420 to determine the reference position of the motion detector. The reference position is an initial/base position of the motion detector 100. The electronic controller 150 processes values corresponding to the reference position of the motion detector 100 and a current position of the motion detector 100 to determine a drift movement of the reference position of the motion detector 100. In some implementations, the drift movement of the reference position is based on a slow-moving average of the reference positions associated with the filter A 410. The drift movement is a gradual change in the reference position over time and the filter B 420 allows the system 102 to reduce and, in some cases, nullify (e.g., realign reference position, calibrate, etc.) the affects of temperature, aging, stress, etc. on components of the motion detector 100. The electronic controller 150 performs computational tasks using the reference position and the current position to determine the output value 430. In one example, the output value 430 is a tilt angle of the motion detector 100.

As already explained in the example illustrated in FIG. 4, the electronic controller 150 receives the output signal of the accelerometer 130 and determines a reference position of the motion detector 100 using the filter A 410. The electronic controller 150 utilizes the filter B 420 to determine a current position and in some implementations, a drift movement in the determined reference position of the motion detector 100 based on an average of the determined reference position corresponding to the filter A 410. In one example, the electronic controller 150 uses values associated with the filter A 410 and the filter B 420 to determine the output value 430 as:

$$\phi = \Sigma |S_{(x,y,z)} - M_{(x,y,z)}| \qquad \text{Equation (1)}$$

where $\phi$ is a tilt angle of the motion detector 100, $S_{(x,y,z)}$ is the reference position from the filter A 410, and $M_{(x,y,z)}$ is the current position from the filter B 420. Referring to FIG. 1, in some implementations, the determined reference position, the current position, and the tilt angle are stored in the memory 154.

Figure 5:
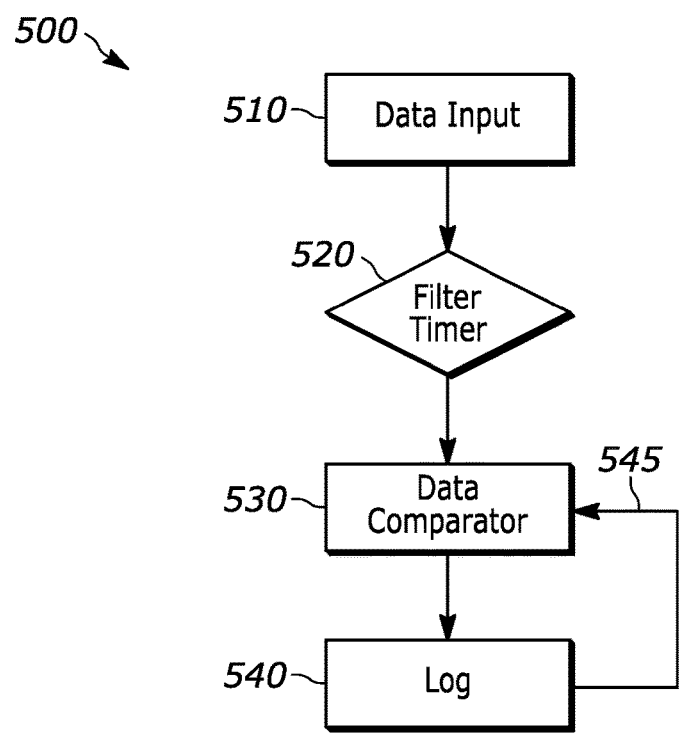
FIG. 5 is a block diagram of a process flow of a filter of FIG. 4, according to some embodiments.

FIG. 5 is a diagram of a filter workflow 500 for processing orientation data. In various implementations, the filter workflow 500 corresponds to the filter A 410 or the filter B 420. The filter workflow 500 includes a data input 510, a filter timer 520, a data comparator 530, a log 540, and a data value 545. The data input 510 corresponds to an output signal of the accelerometer 130 of the motion detector 100. In some implementations, the data input 510 corresponds to a data value associated with a current position from the filter B 420. A filter timer 520 is a timer associated with a time constant for sampling the data input 510. The data comparator 530 evaluates the data input 510 with respect to the data value 545, which may represent a reference position or current position of the motion detector 100. For example, the data value 545 may be a past rate limiting filter output, last recorded evaluation of the data comparator 530, historical positional data of the motion detector 100, etc. The log 540 is a record of results after evaluation of the data input 510, which includes instances of the data value 545.

In some implementations, the data comparator 530 compares the data input 510 to the data value 545 to determine whether to increment or decrement a counter corresponding to the reference position or the current position of the motion detector 100. For example, the data comparator 530 receives the data input 510 after a defined time-period of the filter timer 520 elapses. In this example, the data comparator 530 receives the data value 545 to determine whether the data input 510 is greater than or less than the data value 545. In some instances, the data comparator 530 determines that the data input 510 is greater than the data value 545. In those instances, the data comparator 530 increments an entry (e.g., increases the count by one) in the log 540 that corresponds to the data value 545. In some instances, the data comparator 530 determines that the data input 510 is less than the data value 545. In those instances, the data comparator 530 decrements an entry (e.g., decreases the count by one) an entry in the log 540 that corresponds to the data value 545. In some instances, the filter 520 may reset in response to the defined-time period elapsing, the completion of the evaluation by the data comparator, or a change in the log 540.

Figure 6:
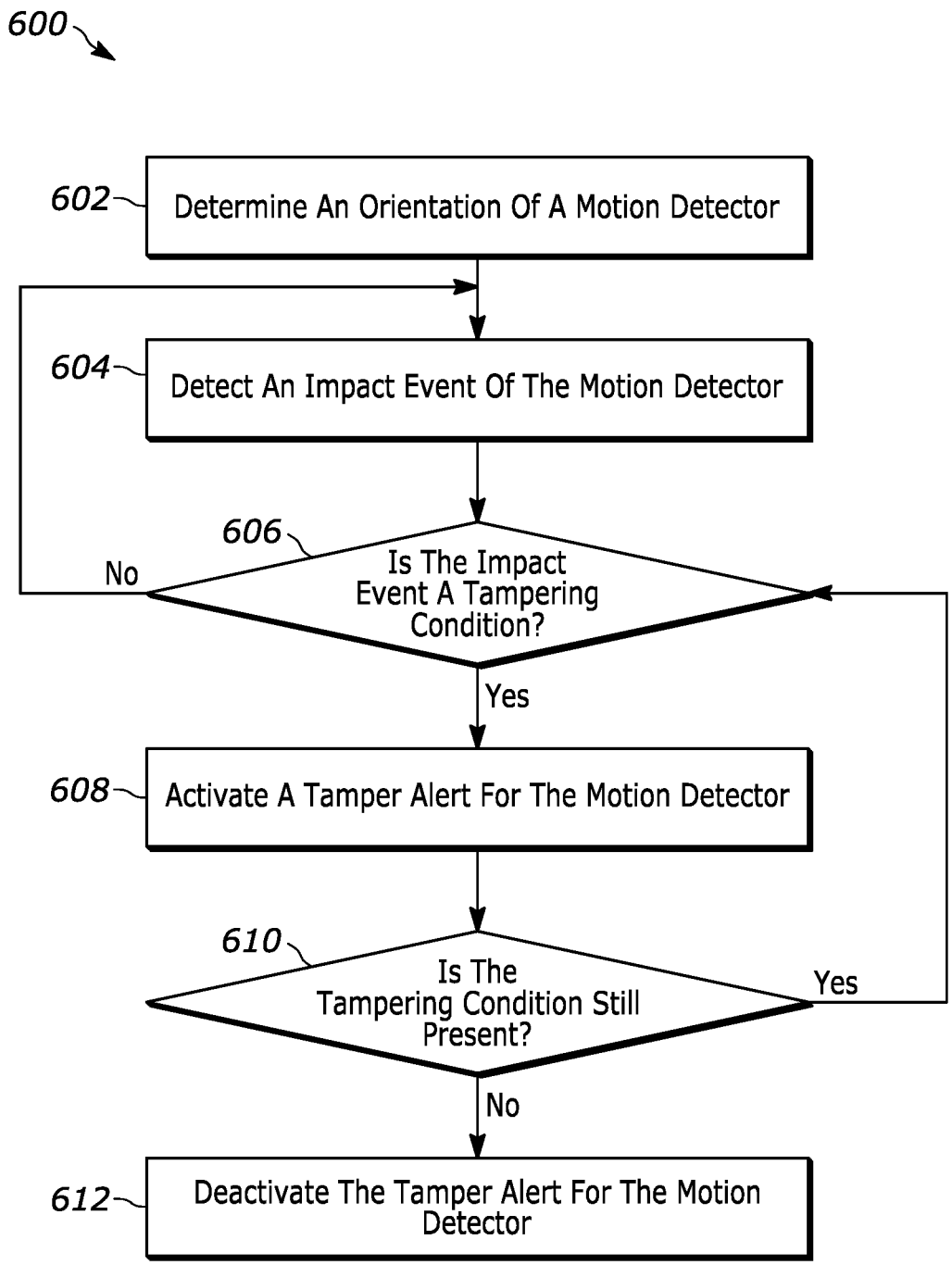
FIG. 6 is a flow chart of method for tamper detection of the motion detector of FIG. 1, according to some embodiments.

FIG. 6 is a flowchart illustrating a method 600 for tamper detection of a motion detector. The method 600 may be performed by the electronic controller 150 (i.e., the electronic processor 152). The electronic controller 150 determines an orientation of a motion detector (at block 602). For example, the electronic controller 150 processes an output signal of the accelerometer 130 of the motion detector 100 to determine a current position (e.g., orientation data, etc.). In this example, the electronic controller 150 determines a reference position of the motion detector 100 using the output signal of the accelerometer 130. Additionally, the electronic controller 150 determines a drift of the motion detector using one or more reference positions determined by the electronic controller 150 over a period of time to calibrate/adjust the reference position of the motion detector 100. The electronic controller 150 also determines a tilt angle corresponding to an orientation of the motion detector 100. Referring back to FIG. 4, in some implementations, the electronic controller 150 determines a tilt angle of motion detector 100 using the filter A 410 and the filter B 420. In some implementations, the electronic controller 150 receives/retrieves orientation data in response to the sensor(s) 120 or the accelerometer 130 indicating motion is occurring.

The electronic controller 150 detects an impact event of the motion detector (at block 604). The impact event represents the affect of external impact forces on the motion detector 100 sensed by the accelerometer 130. In some implementations, the electronic controller 150 receives an output signal of the accelerometer 130 and determines a current position of the motion detector 100. The electronic controller 150 compares the current position to the reference position and determines whether the current position is greater than the reference position to detect an impact event of the motion detector 100. For example, referring to FIG. 2, the electronic controller 150 compares the measurement (e.g., value in g-forces) of the z-axis of the current position of orientation data of the accelerometer 130 to a value of a z-axis of the reference position to detect a deviation, which indicates a force is causing a change in a position of the motion detector 100. Referring again to FIG. 4, for example, in some implementations, the electronic controller 150 uses the filter A 410 and the filter B 420 to calculate a current tilt angle using received orientation data of the accelerometer 130. The electronic controller 150 determines whether the current tilt angle is greater than a tilt angle corresponding to a reference position of the motion detector 100.

The electronic controller 150 determines whether the impact event is a tampering condition (at block 606). The tampering condition corresponds to an impact event that results in removal of the motion detector 100 from an installation surface or a reorientation to such an extent that motion detection capabilities are reduced and/or circumvented. In some implementations, the electronic controller 150 uses a current tilt angle corresponding to an output signal of the accelerometer 130 and a tilt angle of the motion detector 100 from the memory 154 to determine a deviation value corresponding to a detected impact event. The electronic controller 150 compares the deviation value of the motion detector 100 to a deviation threshold to identify a tamper condition exists. In one scenario, the electronic controller 150 determines that a deviation value of the motion detector 100 is greater than a deviation threshold and determines that a tamper condition exists. In this scenario, the electronic controller 150 activates the alarm device 110 of the motion detector 100 responsive to the tamper condition. In another scenario, the electronic controller 150 determines that a deviation value of the motion detector 100 is less than or equal to a deviation threshold and determines that a tamper condition does not exists. In this scenario, the electronic controller 150 does not activate the alarm device 110 of the motion detector and continues to process output signals of the accelerometer 130 for impact events. In some implementations, the electronic controller 150 initiates a temporal threshold in addition to the deviation threshold. The electronic controller 150 determines whether a defined time-period corresponding to the temporal threshold has expired in addition to a deviation value of the motion detector 100 exceeding the deviation threshold. The temporal threshold allows the electronic controller 150 to prevent the electronic processor 152 from signaling the input/output interface 156 to generate and transmit a false tamper indication (e.g., tamper alert signal) to the alarm device 110. For example, a temporal threshold enables the electronic controller 150 to prevent generation of a tamper alert signal in response to the electronic controller 100 determining that a deviation value of the motion detector 150 exceeding a deviation threshold prior to the temporal threshold elapsing (e.g., prevents tamper alerts corresponding to impact events that temporarily displace the motion detector 100).

In one example embodiment, a deviation threshold of the motion detector 100 is approximately three (3) degrees and a temporal threshold is 300 milliseconds. In this example embodiment, the electronic controller 150 determines that a current tilt angle of the motion detector 100 is greater than the deviation threshold at (t)=41 seconds and initiates a timer (e.g., debounce time, delay unit) associated with the temporal threshold. The electronic controller 150 determines that the current tilt angle of the motion detector 100 remains greater than the deviation threshold for the duration of the temporal threshold and transmits a tamper alert signal to the alarm device 110.

The electronic controller 150 activates a tamper alert for the motion detector (at block 608). In some implementations, the electronic controller 150 transmits a tamper alert signal to the alarm device 110. For example, in response to identifying a tamper condition of the motion detector 100 exists, the electronic controller 150 uses the electronic processor 152 to signal the input/output interface 156 to generate and transmit a tamper alert signal to alarm device 110. The electronic controller 150 may utilize the tamper alert signal to control (e.g., activate) the alarm device 110, such as, for example, closing a relay of an alert circuit of the motion detector 100. In some implementations, the input/output interface 156 provides an indication of the tamper condition to an external system to notify authorities.

The electronic controller 150 determines whether the tampering condition is still present (at block 610). In some implementations, the electronic controller 150 continues to receive output signals of the accelerometer 130 and calculate a tilt angle of the motion detector 100. The electronic controller 150 compares a deviation value associated with the tilt angle of the motion detector 100 to a hysteresis deviation threshold to determine whether an identified tamper condition of the motion detector 100 still exists. For example, a hysteresis deviation threshold is less than a deviation threshold due the dependence on an average of orientation data of the motion detector 100 to determine whether to increment or decrement a counter corresponding to the reference position of the motion detector 100. In one scenario, the electronic controller 150 determines that the deviation value of the motion detector 100 is greater than a hysteresis deviation threshold and the defined time-period of a temporal threshold has elapsed. Subsequently, the electronic controller 150 continues to activate the alarm device 110 of the motion detector 100 corresponding to the identified tamper condition. In another scenario, the electronic controller 150 determines that the deviation value of the motion detector 100 is less than or equal to a hysteresis deviation threshold and the defined time-period of a temporal threshold has elapsed. Conversely, the electronic controller 150 deactivates the alarm device 110 of the motion detector 100.

The electronic controller 150 deactivates the tamper alert for the motion detector (at block 612). In some implementations, the electronic controller 150 transmits a deactivation signal to the alarm device 110. For example, in response to determining that a tamper condition of the motion detector 100 no longer exists, the electronic controller 150 uses the electronic processor 152 to signal the input/output interface 156 to generate and transmit a shut off (e.g., deactivation) signal to the alarm device 110. The electronic controller 150 may utilize the shut off signal to control (e.g., deactivate) the alarm device 110, such as, for example, opening a relay of an alert circuit of the motion detector 100.

Thus, this disclosure provides, among other things, systems, methods, and apparatuses for tamper detection of a motion detector by identifying a deviation from determined reference points of the motion detector based on an orientation of the motion detector associated with accelerometer readings. Additionally, this disclosure provides a security mechanism for any fixed position device that may be removed from a mounting surface, for example, in security systems, to protect assets from damage or sabotage.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It should be understood that although certain drawings illustrate hardware and software located within particular devices, these depictions are for illustrative purposes only. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links Various feature, advantages, and embodiments are set forth in the following claims.

What is claimed is:

1. A system for tamper detection of a motion detector, the system comprising:
an electronic controller configured to
receive orientation data from an accelerometer of the motion detector;
filter the orientation data of the accelerometer of the motion detector;
determine an orientation of the motion detector using the filtered orientation data;
determine a reference position of the motion detector using the filtered orientation data, wherein the reference position corresponds to an initial position of the motion detector;
determine a drift of the reference position for the motion detector based on the filtered orientation data, wherein the drift is a change in the reference position for the motion detector over time;
calibrate the reference position for the motion detector based on the drift;
identify a force acting on the motion detector causing a change in the orientation of the motion detector based on the calibrated reference position and a current position of the motion detector;
identify a tamper condition of the motion detector based on the change in the orientation of the motion detector from the calibrated reference position and a deviation threshold; and
activate an alarm device of the motion detector based on the tamper condition.

2. The system of claim 1, wherein the electronic controller is further configured to:
determine that the change in the orientation of the motion detector occurs for greater than a defined time-period.

3. The system of claim 2, wherein the electronic controller is further configured to:
modify a set of reference points for the reference position of the orientation of the motion detector based on a result of the change in the orientation being greater than or less than a historical set of reference points.

4. The system of claim 1, wherein identifying the tamper condition of the motion detector, further comprises:
determine that the change in the orientation of the motion detector is greater than the deviation threshold, wherein the change in the orientation of the motion detector corresponds to an external event that impacts the orientation data of the motion detector.

5. The system of claim 4, wherein the electronic controller is further configured to:
determine that the change in the orientation of the motion detector is less than the deviation threshold for a defined time-period.

6. The system of claim 5, wherein the electronic controller is further configured to:
deactivate the alarm device of the motion detector based on the change in the orientation of the motion detector and the defined time-period.

7. A method for tamper detection of a motion detector, the method comprising:
receiving, via an electronic controller, orientation data from an accelerometer of the motion detector;
filtering, via the electronic controller, the orientation data of the accelerometer of the motion detector;
determining, via the electronic controller, an orientation of the motion detector using the filtered orientation data;
determining, via the electronic controller, a reference position of the motion detector using the filtered orientation data, wherein the reference position corresponds to an initial position of the motion detector;
determining, via the electronic controller, a drift of the reference position for the motion detector based on the filtered orientation data, wherein the drift is a change in the reference position for the motion detector over time;
calibrating, via the electronic controller, the reference position for the motion detector based on the drift;
identifying, via the electronic controller, a force acting on the motion detector causing a change in the orientation of the motion detector based on the calibrated reference position and a current position of the motion detector;
identifying, via the electronic controller, a tamper condition of the motion detector based on the change in the orientation of the motion detector from the calibrated reference position and a deviation threshold; and
activating, via the electronic controller, an alarm device of the motion detector based on the tamper condition.

8. The method of claim 7, further comprising:
determining, via the electronic controller, that the change in the orientation of the motion detector occurs for greater than a defined time-period.

9. The method of claim 8, further comprising:
modifying, via the electronic controller, a set of reference points for the reference position of the orientation of the motion detector based on a result of the change in the orientation being greater than or less than a historical set of reference points.

10. The method of claim 7, wherein identifying the tamper condition of the motion detector, further comprises:
determining, via the electronic controller, that the change in the orientation of the motion detector is greater than the deviation threshold, wherein the change in the orientation of the motion detector corresponds to an external event that impacts the orientation data of the motion detector.

11. The method of claim 10, further comprising:
determining, via the electronic controller, that the change in the orientation of the motion detector is less than the deviation threshold for a defined time-period.

12. The method of claim 10, further comprising:
deactivate the alarm device of the motion detector based on the change in the orientation of the motion detector and a defined time-period.

13. A motion detector comprising:
an alarm device;
an electronic controller;
at least one sensor, wherein the at least one sensor provides an indication of motion to the electronic controller;
an accelerometer, wherein the accelerometer provides orientation data of the motion detector to the electronic controller;
wherein the electronic controller is configured to filter the orientation data of the accelerometer;
wherein the electronic controller is configured to determine an orientation of the motion detector using the filtered orientation data;
wherein the electronic controller is configured to determine a reference position of the motion detector using the filtered orientation data, wherein the reference position corresponds to an initial position of the motion detector;

wherein the electronic controller is configured to determine a drift of the reference position for the motion detector based on the filtered orientation data, wherein the drift is a change in the reference position for the motion detector over time;

wherein the electronic controller is configured to calibrate the reference position for the motion detector based on the drift;

wherein the electronic controller is configured to identify a force acting on the motion detector causing a change in the orientation of the motion detector based on the calibrated reference position and a current position of the motion detector;

wherein the electronic controller is configured to identify a tamper condition of the motion detector based on the change in the orientation of the motion detector from the calibrated reference position and a deviation threshold; and wherein the electronic controller is configured to activate the alarm device based on the tamper condition.

14. The motion detector of claim 13, wherein the electronic controller is further configured to determine that the change in the orientation occurs for greater than a defined time-period.

15. The motion detector of claim 14, wherein the electronic controller is further configured to modify a set of reference points for the reference position of the orientation of the motion detector based on a result of the change in the orientation being greater than or less than a historical set of reference points.

16. The motion detector of claim 13, wherein identifying the tamper condition of the motion detector, further comprises:

wherein the electronic controller is configured to determine that the change in the orientation of the motion detector is greater than the deviation threshold, wherein the change in orientation of the motion detector corresponds to an external event that impacts the orientation data of the motion detector.

17. The motion detector of claim 16, wherein the electronic controller is further configured to, in response to determining that the change in the orientation of the motion detector is less than the deviation threshold for a defined time-period, deactivate the alarm device of the motion detector based on the change in the orientation of the motion detector and the defined time-period.

* * * * *